March 19, 1957 J. F. CAMERON 2,785,485
COMBINATION PACKAGE AND VIEWER FOR PHOTOGRAPHIC
TRANSPARENCIES OR THE LIKE
Filed Nov. 14, 1955 2 Sheets-Sheet 1
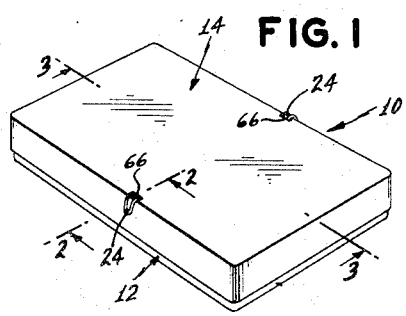
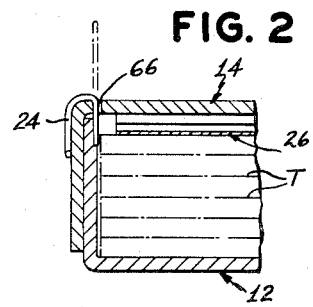
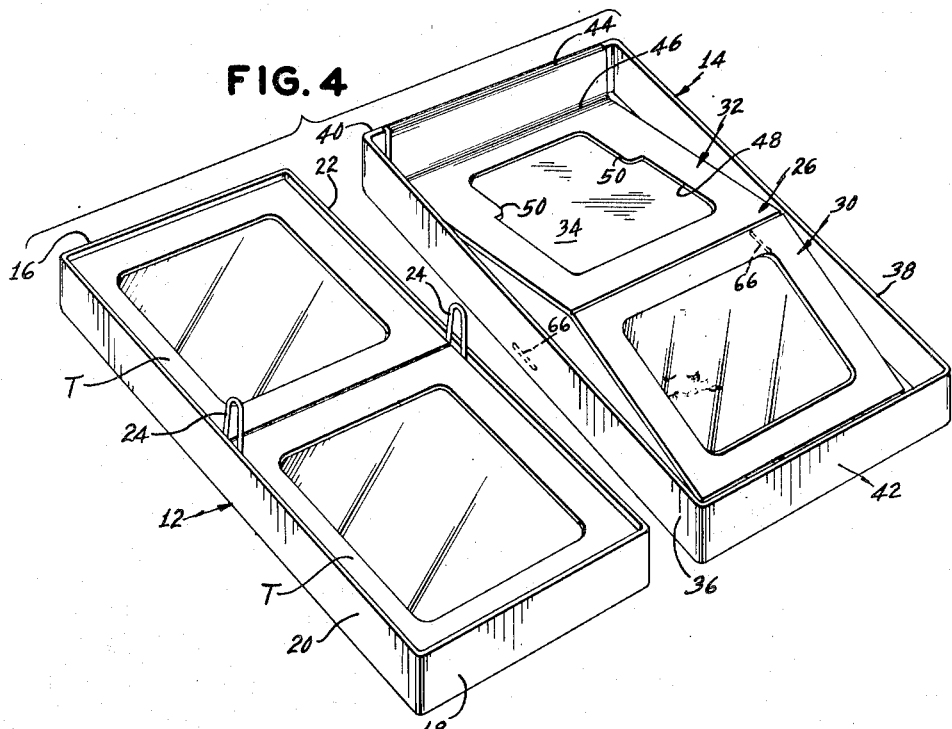
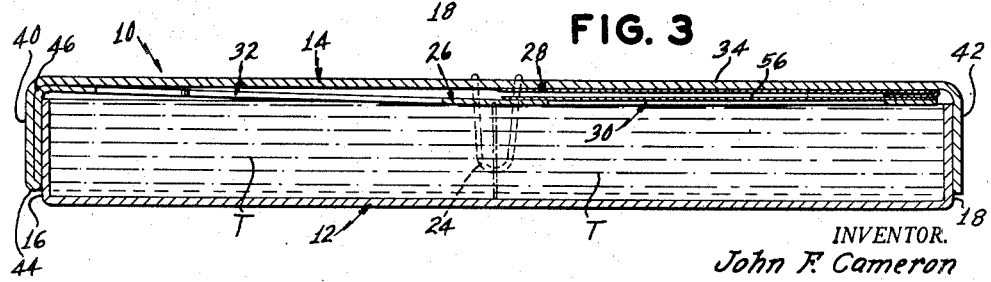
INVENTOR.
John F. Cameron
BY
ATTORNEYS

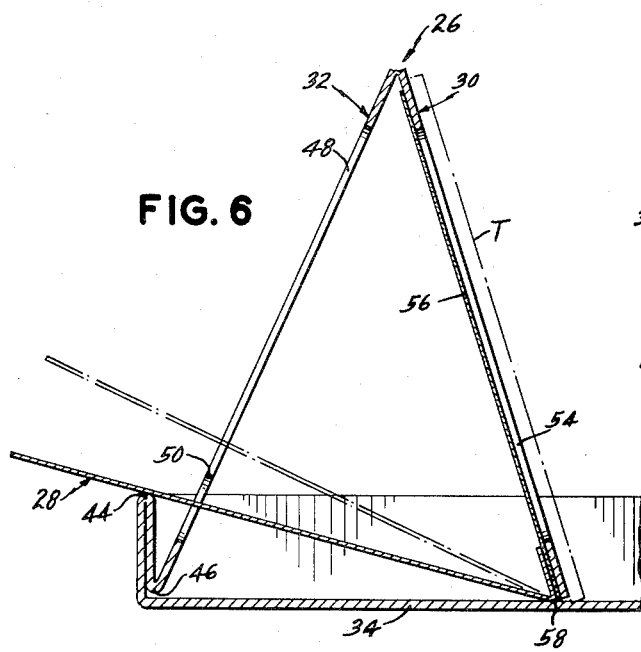
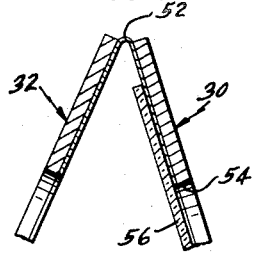
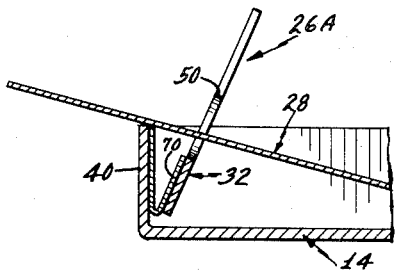
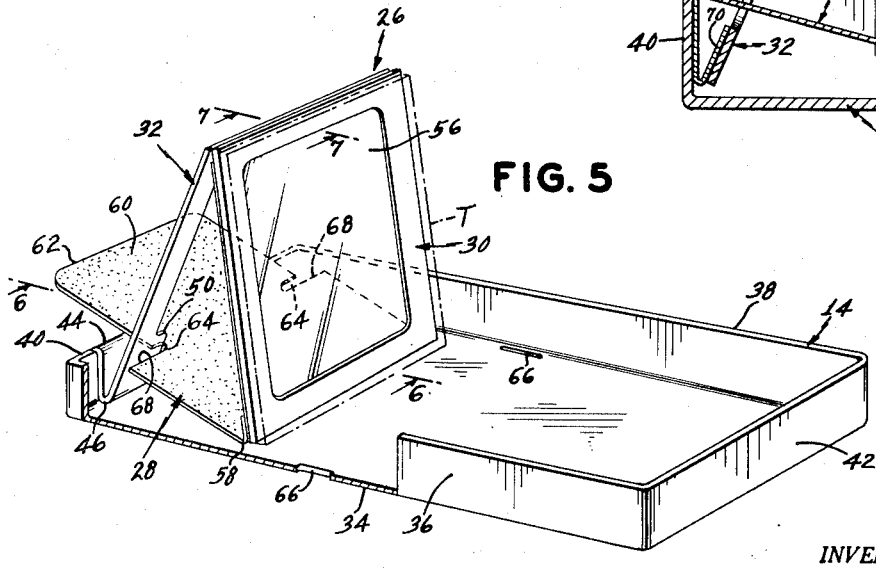

UnitedStates Patent Office 2,785,485
Patented Mar. 19, 1957

2,785,485

COMBINATION PACKAGE AND VIEWER FOR PHOTOGRAPHIC TRANSPARENCIES OR THE LIKE

John F. Cameron, Old Greenwich, Conn.

Application November 14, 1955, Serial No. 546,468

6 Claims. (Cl. 40—1)

The present invention relates, in general, to packaging devices and, in particular, to a package for photographic transparencies or the like.

The primary object of the present invention is the provision of a packaging device for color transparencies, slides, or the like which provides a readily available viewer for the transparencies or slides so as to obviate the need for a separate viewer.

Another object is the provision of a relatively inexpensive packaging device for color transparencies or slides which includes a viewer and which can be manufactured and sold at a relatively low cost so as not to materially increase the charge made for developing the transparencies or slides or which can be given away as a premium.

Another object is the provision of a combined mailing package and viewer for color transparencies or slides wherein the viewer serves as a cushioning or protective device for the contents of the package.

A further object is the provision of a highly novel and relatively inexpensive combination packaging device and transparency viewer.

The above and other objects, features and advantages of the present invention will be more fully understood from the following description considered in connection with the accompanying illustrative drawings.

In the drawings which illustrate the best mode presently contemplated of carrying out the invention:

Fig. 1 is a perspective view of a packaging device pursuant to the present invention;

Fig. 2 is a fragmentary sectional view, on an enlarged scale, taken on the line 2—2 of Fig. 1;

Fig. 3 is a sectional view, on an enlarged scale, taken on the line 3—3 of Fig. 1;

Fig. 4 is a perspective view, on an enlarged scale, illustrating the cover removed from the holder of the packaging device, the viewer being illustrated in the inoperative disposition thereof on the cover;

Fig. 5 illustrates the viewer in operative disposition thereof on the cover, a portion of the cover being broken away for purposes of illustration;

Fig. 6 is a fragmentary sectional view, on an enlarged scale, taken on the line 6—6 of Fig. 5;

Fig. 7 is a fragmentary sectional view, on an enlarged scale, taken on the line 7—7 of Fig. 5; and Fig. 8 is a fragmentary view similar to Fig. 6 and illustrates a modification.

Referring now to Figs. 1 through 7 of the drawings in detail, the reference numeral 10 generally indicates a packaging device pursuant to the present invention. As here shown, the package 10 comprises a body member or receptacle 12 and a cover 14 therefor, which together form a box for holding photographic transparencies, slides, etc. The body member 12 is generally of rectangular configuration and is dimensioned to hold two stacks of color transparencies or slides T which substantially fill the body part 12 between the end walls 16 and 18 thereof, as best illustrated in Fig. 3, and between the side walls 20 and 22 thereof, as best illustrated in Fig. 4. Substantially centrally thereof, the opposing side walls 20 and 22 are provided with conventional wire clips or fastening elements 24 which are secured at the inner surface thereof in the usual manner well known to those skilled in the art. The body part 12 is formed of any sheet material suitable for the purpose, such as for example and not by way of limitation, cardboard or paperboard.

Pursuant to the present invention, the cover or closure part 14 is provided with a viewer 26 for color transparencies, slides or the like. As here shown, the viewer 26 is formed by the three articulated segments 28, 30 and 32. Said segments cooperate to form an easel type viewer wherein segment 30 serves as a back rest or support for the transparency, segment 28 serves to reflect light to segment 30, and segment 32 serves both as a support for the viewer and as a light admitting element for the viewer.

The closure or cover 14 is formed of suitable sheet material, preferably paperboard or cardboard, being provided with the base wall 34 from which there projects the opposing side walls 36 and 38 and the opposing end walls 40 and 42. The side walls and the end walls are integral with the base or rear wall 34 and the articulated segment 32 of the viewer 26 is integral with the end wall 40. More particularly, and as best shown in Figs. 3, 5 and 6, the end wall 40 is provided with a folded or reflexed portion, at its inner surface, having an upper fold 44 at its juncture with the end wall 40 and a lower fold or hinge portion 46 at its juncture with the viewer segment 32, viewing Fig. 6. The segment or frame member 32 is provided with a light opening or cut out 48 which defines the confronting detents 50—50, as best illustrated in Figs. 4 and 5. The free end of the segment 32 is hinged to the segment 30 by a strip of flexible sheet material, preferably paper, which constitutes the hinge 52 secured, as by a suitable adhesive, to the confronting surfaces of the segments 30 and 32, as best illustrated in Fig. 7.

The segment or frame member 30 is also provided with a cut out or opening 54 and said opening is covered by a translucent window 56 which is suitably secured to the member 30, as by a suitable adhesive.

The reflector 28 is suitably secured to the frame member 30, as by an adhesive, at the hinge or fold portion 58 thereof. Viewing Fig. 5, the upper surface of the segment 28 is provided with a suitable light reflecting material 60, for example and not by way of limitation, silver or tin foil. The segment 28 is provided with a narrow portion or tongue 62 which is dimensioned to enter or pass through the opening 48 in the frame member 32 and has the slots 64—64 which are adapted to receive the previously mentioned detents 50—50, respectively, of the frame member 32.

As hereinafter explained in detail, the closure 14 constitutes a mounting or base for the transparency viewer 26 in the operative disposition of the latter and, in addition, the closure 14 is provided with the slots 66—66 which cooperate with the previously mentioned clips 24—24.

Since the frame members or segments 30 and 32 of the viewer 26 are formed of a more rigid material than the material utilized for forming the hinge 52 therebetween, the viewer in its inoperative and collapsed condition, as indicated in Fig. 4, assumes a position, due to the resiliency of the hinge 52, whereby the frame sections 30 and 32 are diagonally related relative to the base 34 of the closure member 14, with the hinge 52 spaced upwardly from the base. Fig. 3 illustrates the packaging device 10 filled with transparencies or slides T and having the cover or closure 14 in position on the body part 12. When the cover 14 is placed on the body part 12, the clips 24 will project through the slots 66 in the cover, as best illustrated in broken line in Fig. 2, and in order to secure the cover in position on the base 12, the clips are bent over to the full line position thereof illustrated in Fig. 2. The package is now in condition for mailing, storage or any other intended use thereof. It will be noted that in said condition of the package, the viewer 26 assumes the position illustrated in Fig. 3 being interposed between the base 34 of the cover 14 and the stacked transparencies T. As previously indicated, the hinge 52 imparts resiliency to the viewer 26 so that in the condition thereof illustrated in Fig. 3, the viewer serves as a cushioning device and as a filler within the package 10. This prevents undesirable movement of the transparencies T within the package and also provides a resilient buffer between the transparencies and the cover 14 of the package to take up shock or blows directed against the package so as to protect the contents thereof. In this connection, it will be understood that the package 10 may serve as a mailing box for mailing the transparencies T from the developer to his customers. Stamps will be applied to the cover 14 so that the transparency viewer 26 will take up the shock incident upon the cancellation of the stamps at the Post Office, thereby protecting the transparencies T from damage.

When it is desired to use the viewer for observing the transparencies, the clips 24 are opened and the cover 14 is removed. The cover is placed upon its back or base 34, as illustrated in Fig. 4, and the hinge 52 may be readily grasped at both ends thereof to raise the segments 30 and 32 from the illustrated position. When the segments have been raised, the tongue 62 of the reflecting segment 28 is inserted into the opening 48, in the frame 32, above the detents 50—50 thereof. The shoulders 68—68 provided on the segment 28 limit the insertion of the tongue 62 into the opening 48 and when the shoulders abut the frame 32 the slotted portions 64 of the segment 28 are adjusted on the frame 32 to engage the adjacent detents 50 so as to releasably retain or lock the viewer in the operative disposition thereof illustrated in Fig. 5. It will be noted that in this condition of the viewer, the cover 14 serves as a base or stand for the viewer so that the latter may be positioned on any convenient surface. In order to view the transparencies the cover 14 is suitably positioned so that artificial light or natural light will be directed at the reflecting surface 60 of the segment 28, it being noted that said surface is angularly disposed relative to the base 34 of the cover 14 for reflecting the light through the opening 48 of the frame 32 at the rear of the translucent window 56. A slide or transparency T may be placed against the front surface of the window 56, the transparency being disposed at its bottom edge on the base 34 and resting against the frame 30. The light reflected by the surface 60 will pass through both the window 56 and the overlying transparency to make the latter readily viewable.

In view of the foregoing, it will be noted that the articulated transparency viewer 26 is in the form of an easel provided with a translucent window and a light reflector. When it is desired to disassemble the easel or viewer 26, this may readily be accomplished by lifting the free end of the tongue 62 to disengage the slots 64 from the detents 50 and then urging the segment 28 through the opening 48 to permit the collapse of the viewer to the condition thereof illustrated in Fig. 4.

Referring to Fig. 8, there is illustrated a modification in the connection of the viewer 26 to the package cover 14. In the prior embodiment, the frame 32 of the viewer was integral with the cover 14. In the present embodiment, the viewer 26A has its frame 32 connected to the end wall 40 of the cover 14 by a separate hinge 70. The hinge 70 is formed of suitable material, for example and not by way of limitation, paper or thin cardboard which is secured, as by a suitable adhesive, to the bottom of the frame 32 and to the adjacent inner surface of the wall 40. In all respects, the construction of the viewer 26A is exactly the same as the previously described viewer 26, and the viewer 26A operates and functions in exactly the same manner as previously described.

It will be noted that in each case, when the segment 32 is or is not integral with the cover 14, the latter, at the end wall 40 thereof, serves as a detent or support for the segment 28 in the operative disposition of the viewer.

While I have shown and described the preferred embodiments of my invention, it will be understood that various changes may be made in the idea or principles of the invention within the scope of the appended claims.

Having thus described my invention, what I claim and desire to secure by letters patent is:

1. A combined holding and viewing device for photographic transparencies or the like comprising container means adapted to hold a stack of transparencies, said container means including a transparency viewer which is collapsible from an erected operative condition thereof in which said container means constitutes a mounting base for the viewer to an inoperative condition to overlie the stack of transparencies, said viewer having three articulated sections, the intermediate section being provided with a translucent window, one of the outer sections being hinged to said container means, and the other outer section having a light reflecting portion and being releasably engageable with said one outer section to mount the reflecting portion thereof for reflecting light toward said window.

2. A combined holding and viewing device for photographic transparencies or the like comprising container means adapted to hold a stack of transparencies, said container means including a transparency viewer which is collapsible from an erected operative condition thereof in which said container means constitutes a mounting base for the viewer to an inoperative condition to overlie the stack of transparencies, said viewer having three articulated sections, the intermediate section being provided with a translucent window, one of the outer sections being hinged to said container means, and the other outer section having a light reflecting portion and being releasably engageable with said one outer section to mount the reflecting portion thereof for reflecting light toward said window, said one outer section being connected to said intermediate section by a hinge formed of a material which has a greater degree of flexibility than the material of which said articulated sections are formed.

3. A holding and viewing device as defined in claim 1, further characterized in that a hinge integral with the container means and with said one outer section connects the viewing device to the container means.

4. A combined holding and viewing device for photographic transparencies or the like comprising container means for holding transparencies in stacked relation, said container means comprising a body member and a complementary cover member, and a transparency viewer provided on said cover member, said transparency viewer being collapsible from an erected operative condition thereof in which said cover member constitutes a mounting base for the viewer to an inoperative condition to overlie the stacked transparencies on said body member when the latter is covered by said cover member, said viewer comprising articulated parts which form an easel in the operative condition of the viewer, one of said parts having a translucent window, another of said parts being hinged to the cover member, and an additional part being releasably engageable with said hinged part for maintaining said easel in operative condition thereof.

5. A holding and viewing device as defined in claim 4, further characterized in that said additional part comprises a light reflector which reflects light to said window when releasably engaged with said hinged part.

6. A holding and viewing device as defined in claim 4, further characterized in that said hinged part is integral with said cover member.

(References on following page)

References Cited in the file of this patent

UNITED STATES PATENTS

| | | |
|---|---|---|
| 335,178 | Case et al. | Feb. 2, 1886 |
| 481,173 | Heymann | Aug. 23, 1892 |
| 677,108 | Weis | June 25, 1901 |
| 949,904 | King | Feb. 22, 1910 |
| 1,989,454 | Koster | Jan. 29, 1935 |
| 2,654,173 | Christensen et al. | Oct. 6, 1953 |

FOREIGN PATENTS

| | | |
|---|---|---|
| 495,984 | Great Britain | Nov. 23, 1938 |